US006272735B1

(12) United States Patent
Moriwake et al.

(10) Patent No.: US 6,272,735 B1
(45) Date of Patent: Aug. 14, 2001

(54) TEMPERATURE SENSOR AND A METHOD OF MANUFACTURING THE SAME

(75) Inventors: Hiroki Moriwake, Hyogo; Nobuharu Katsuki, Osaka; Tsuyoshi Tanaka, Osaka; Katsunori Matsubara, Osaka; Takashi Tamai, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/324,807

(22) Filed: Jun. 3, 1999

Related U.S. Application Data

(62) Division of application No. 08/836,274, filed on Jul. 28, 1997, now Pat. No. 6,164,819.

(30) Foreign Application Priority Data

Aug. 31, 1995 (JP) .................................................. 7-223289

(51) Int. Cl.[7] ...................................................... H01C 7/02
(52) U.S. Cl. .......................... 29/612; 338/22 R; 374/185; 29/613; 29/619
(58) Field of Search ................................... 29/610.1, 611, 29/612; 338/25, 28, 29; 374/185, 140

(56) References Cited

U.S. PATENT DOCUMENTS

| 4,086,085 | * 4/1978 | McGurty | 75/124 |
|---|---|---|---|
| 4,721,533 | 1/1988 | Phillippi et al. | |
| 5,603,571 | * 2/1997 | Eckert | 374/140 |
| 5,688,266 | * 11/1997 | Edwards et al. | 606/31 |
| 5,694,107 | * 12/1997 | Moriwake | 338/202 |

FOREIGN PATENT DOCUMENTS

| 24 28 532 | 1/1975 | (DE) . |
|---|---|---|
| 0 680 053 | 11/1995 | (EP) . |
| 2 013 022 | 8/1979 | (GB) . |
| 50-16895 | 2/1975 | (JP) . |
| 50-119268 | 9/1975 | (JP) . |
| 55-166902 | 12/1980 | (JP) . |
| 6-307943 | 4/1994 | (JP) . |
| 06-283310 | 10/1994 | (JP) . |

\* cited by examiner

Primary Examiner—Lee Young
Assistant Examiner—Sean Smith
(74) Attorney, Agent, or Firm—McDermott, Will & Emery

(57) ABSTRACT

In order to present a temperature sensor which works stable also in a high temperature condition showing only a small deviation in the resistance value of thermistor, the invented temperature sensor comprises a heat resisting cap (5) made of a metal, a thermistor (1) housed inside the heat resisting cap (5) and at least more than one lead wire (4) which is electrically connected with the thermistor (1) and is pulled out of said heat resisting cap (5), said heat resisting cap (5) being formed with an alloy containing Ni—Cr as the main ingredient.

12 Claims, 3 Drawing Sheets

TEMPERATURE SENSOR AND A METHOD OF MANUFACTURING THE SAME

This is a divisional application of Ser. No. 08/836,274, filed Jul. 28, 1997 now U.S. Pat. No. 6,164,819.

TECHNICAL FIELD

The present invention is related to a temperature sensor using a thermistor of negative temperature coefficient and a method of manufacturing the same.

BACKGROUND OF THE INVENTION

In order to prevent a thermistor of a temperature sensor from indicating a resistance value that is deviating from the value it should have at a certain temperature, in particular in a high temperature zone, the atmosphere around thermistor has to be kept consistent. A prior art as disclosed by Japanese Patent Laid-Open No. 6-307943 teaches to provide a heat resisting cap housing a thermistor with an air ventilation hole.

However, if the ventilation hole is clogged by some reason, it fails to maintain the ambient of a thermistor consistent. The problem that resistance of a thermistor deviates much from a should-be value still remains unsolved.

DISCLOSURE OF THE INVENTION

The present invention is intended to provide a temperature sensor of stable functioning, through a means for preventing a thermistor from indicating a resistance that is deviating from said should-be value even in a high temperature condition.

The invented temperature sensor comprises a heat resisting cap, a thermistor housed inside the heat resisting cap, and at least one lead wire which is electrically coupled with the thermistor and is taken outside the heat resisting cap. The heat resisting cap is made of an alloy containing Ni—Cr as the main ingredient. The above described structure implements a temperature sensor working stable also in a high temperature condition (e.g. 1000° C. or more), thermistor of which sensor indicating a resistance that is not deviating much from the should-be value, without an air ventilation hole or such other contrivance which was needed in a prior art temperature sensor.

BEST MODE FOR CARRYING OUT THE INVENTION

In the following, a temperature sensor according to the present invention and a manufacturing method therefor according to an embodiment are described in detail referring to drawings.

(Embodiment 1)

Figure 1:
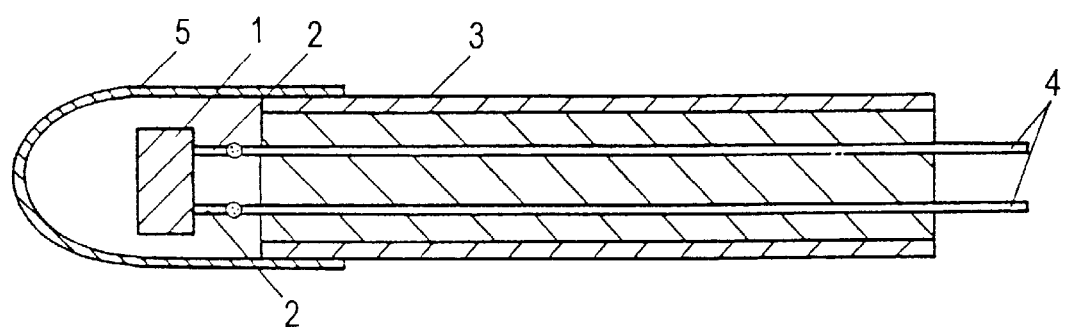
FIG. 1 is a cross sectional view showing a temperature sensor according to an embodiment of the present invention.

A first embodiment is described with reference to FIG. 1. An $(Al,Cr,Fe)_2O_3$ system material is formed into a solid body having two holes, into which platinum (Pt) wires 2 are inserted as the electrode, and then sintered together to obtain a thermistor 1. The Pt wires 2 and lead wires 4 of a two-wired tube 3 are welded together respectively, and then a heat resisting cap 5 made of a heat-resistant alloy containing Ni—Fe—Cr as the main ingredient, inconel-600, is disposed over the thermistor, calked and welded to complete a temperature sensor as shown in FIG. 1.

For testing the durability in high temperature the temperature sensing part of the temperature sensor is kept in a 1100° C. chamber for 10 hours, and resistance values at 900° C. before and after the testing were measured to calculate the rate of resistance shift(%) in accordance with Formula 1.

Rate of resistance shift(%)=100×(resistance value (Ω) before testing−resistance value (Ω) after testing)÷(resistance value (Ω) before testing)   Formula 1

The results are shown in Table 1 below.

TABLE 1

| Resistance value before testing | Resistance value after testing | Rate of resistance shift |
|---|---|---|
| 820Ω | 919Ω | +12% |

As Table 1 shows, the resistance value of the temperature sensor according to the present embodiment at 900° C. represents only a slight shift after the 10-hour storage in 1100° C., as compared with the 900° C. value before. It is understood that the temperature sensor can be used also in a high temperature condition over 1000° C.

The inventors of the present invention have made a new finding that a most significant factor causing the deterioration in high temperature is in the reduction of thermistor 1 under a high temperature environment. The mechanism of the phenomenon is described in the following. When a heat resisting cap 5 is exposed to a high temperature, an oxide film is formed on the surface of heat resisting cap 5, which induces a decreased partial pressure of oxygen in the ambient of thermistor 1 inside the heat resisting cap 5. Furthermore, a carbon, a hydrogen etc. which have been contained in a metal constituting the heat resisting cap 5 are discharged to react with oxygen, further lowering the partial pressure of oxygen to create a reductive atmosphere.

As a thermistor 1 is normally comprised of an oxide, oxygen is deprived of in the reductive ambient, inviting the shift in resistance value.

In order to prevent occurrence of the deterioration due to reduction and to obtain a temperature sensor that works stable even at 1100° C., an alloy containing Ni—Cr—Fe as the main ingredient may be used as the material for heat resisting cap 5; while either one of the materials selected from the group of a $Mg(Al,Cr,Fe)_2O_4$ system material, a $Mg(Al,Cr)_2O_4$ system material and an $(Al,Cr,Fe)_2O_3$ system material may be used as the material for thermistor 1. With these materials it is difficult for the oxygen to be deprived of even in a reductive atmosphere, therefore thermistor 1 is hardly reduced; the resistance thereof does not show a significant shift. When the alloy containing Ni—Cr—Fe as the main ingredient is exposed to a high temperature oxidizing atmosphere, an oxide film containing Ni, viz. film of Ni oxide, Ni—Fe oxide, Ni—Cr oxide, Ni—Cr—Fe oxide etc. is formed on the surface. When the atmosphere inside heat resisting cap 5 turns into reductive at the neighborhood of 1100° C., these Ni-containing oxides discharge oxygen, as a result the atmosphere inside heat resisting cap 5 is maintained within a range where the resistance value of thermistor 1 stays stable. The above described is supposedly the reason why the shift in resistance value of temperature sensor has been minimized. As a temperature sensor according to the present invention has a closed structure not being affected by an outside environment, the reliability of which sensor is much higher as compared with a prior art temperature sensor having an air ventilation hole provided for keeping the ambient around thermistor 1 consistent.

As described in the embodiment above, a temperature sensor that functions stable even at a 1100° C. condition is obtainable by forming the thermistor 1 with a thermistor material that stays stable in a reductive atmosphere, for example a $Mg(Al,Cr,Fe)_2O_4$ system material, a $Mg(Al,Cr)_2O_4$ system material, an $(Al,Cr,Fe)_2O_3$ system material; while forming the heat resisting cap 5 with a heat-resistant alloy containing Ni—Cr, Ni—Cr—Fe as the main ingredient, which produces a Ni-containing oxide film when oxidized.

For the convenience of volume production, the quantity of Cr in the alloy material containing Ni—Cr, Ni—Cr—Fe as the main ingredient should preferably be not more than 20%; with such content, a required oxide film is easily made available by heat treatment in the air.

(Embodiment 2)

Figure 2:
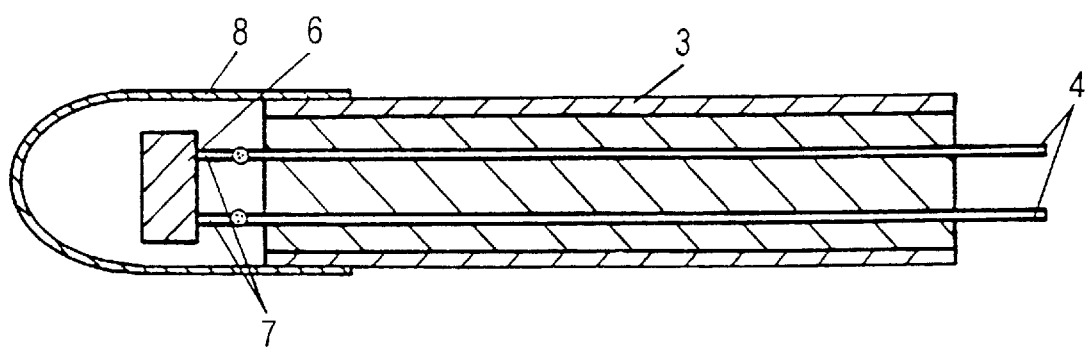
FIG. 2 is a cross sectional view showing a temperature sensor according to another embodiment of the present invention.

A second embodiment is described referring to FIG. 2. An $(Al,Cr,Fe)_2O_3$ system material is formed into a solid body having two holes, into which Pt pipes 7 are inserted as the electrode, and then sintered together to obtain a thermistor 6. The lead wires 4 of a two-wired tube 3 are inserted to the Pt pipes 7 of thermistor 6 respectively to be welded together, and then a heat resisting cap 8 comprised of a heat-resistant alloy containing Ni—Fe—Cr as the main ingredient, inconel-600, 1100° C. heat treated in the air for 10 hours, is disposed to cover the thermistor 6, calked and welded to complete a temperature sensor as shown in FIG. 2.

For testing the durability in high temperature the temperature sensing part of the temperature sensor is kept in a 1100° C. chamber for 10 hours, and resistance values at 900° C. before and after the testing were measured to calculate the rate of resistance shift(%) in accordance with Formula 1. The results are shown in Table 2 below.

TABLE 2

| Resistance value before testing | Resistance value after testing | Rate of resistance shift |
|---|---|---|
| 825Ω | 891Ω | +8% |

As Table 2 shows, the resistance at 900° C. of the temperature sensor according to the present embodiment shows only a slight shift after the 10-hour storage in 1100° C., as compared with the 900° C. value before. It is understood that the temperature sensor is usable even in a high temperature condition exceeding 1000° C. Because Pt pipes 7 are used as the electrode of thermistor 6, only few of thermistor 6 is rejected due to crack or such other reasons, enabling volume production in a stable manner. Because the temperature sensor is assembled with a heat resisting cap 8 which already had a heat treatment and a required oxide film containing Ni oxide is already formed on the surface, lowering of the oxygen partial pressure inside the heat resisting cap 8 accompanied by the formation of an oxide film is avoided in a finished temperature sensor. This lowers the rate of resistance shift by the 1100° C. heat chamber further, as compared with a case where no prior heat treatment is applied on heat resisting cap 8.

Although in the present embodiment a Pt pipe 7 is used as the electrode of thermistor 6, other metals whose melting point is higher than sintering temperature of thermistor 6, for example a Pt—Rh alloy, may also be used.

Although in the present embodiment the heat resisting cap 8 is heat-treated in the air, the heat treatment may either be conducted in various oxidizing atmosphere in which an oxide film containing Ni oxide is formed.

(Embodiment 3)

The temperature sensing part of temperature sensors according to Embodiment 1 were kept in a 1100° C. heat chamber for 5 hours for heat treatment and then the resistance at 900° C. was measured. And a 1100° C. endurance test was conducted for 10 hours and then the resistance at 900° C. was measured. The results are as shown in Table 3.

TABLE 3

| Resistance value before testing | Resistance value after testing | Rate of resistance shift |
|---|---|---|
| 885Ω | 902Ω | +2% |

As Table 3 indicates, the rate of resistance shift in the 1100° C. endurance test is lowered by a heat treatment applied on a finished temperature sensor.

(Embodiment 4)

Figure 3:
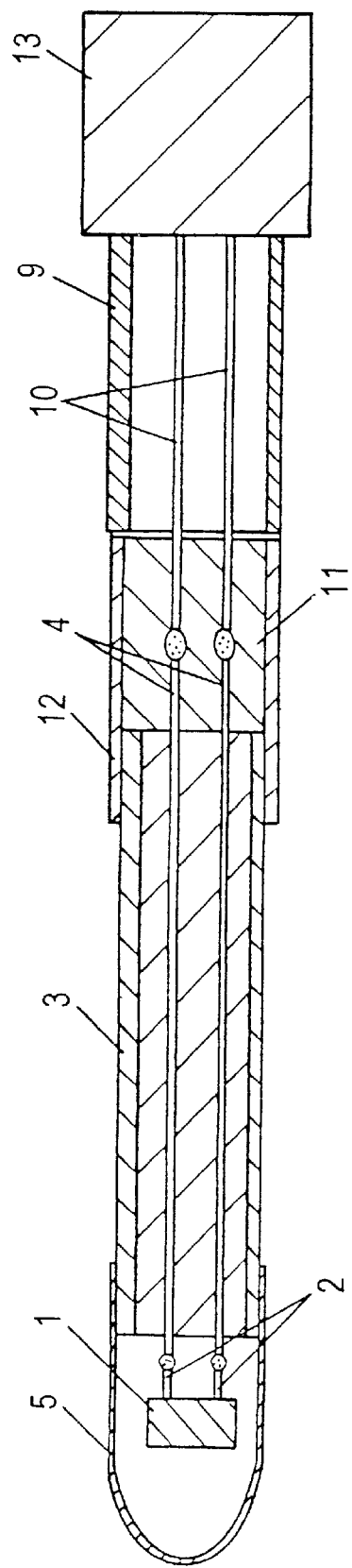
FIG. 3 is a cross sectional view showing a temperature sensor according to a still other embodiment of the present invention.

A fourth embodiment is described with reference to FIG. 3. With a temperature sensor obtained through the same way as in Embodiment 1, the lead wires 4 of two-wired tube 3 are welded respectively with lead wires 10 of a cable 9, a rubber bushing 11 is inserted to, a collar 12 is provided, and calked for fixing. A connector 13 is connected to the other end of cable 9 to complete a temperature sensor. As the temperature sensor of this structure is additionally provided with a cable 9 and a connector 13, it can easily be installed in a measuring instrument or such other equipment. The rubber bushing 11 prevents possible intrusion of foreign substances. Although in the present embodiment a connector 13 of only one model is described, any other connectors or cables may of course be used.

In the above embodiments, descriptions are made only on a heat treatment of 1100° C. on the heat resisting caps 5, 8. The heat treatment may be conducted at a temperature within a range 1000° C.–1200° C., because the highest service temperature of the invented temperature sensor is within the temperature range. Reductive materials contained within the heat resisting caps 5, 8 are removed by the heat treatment before being put on actual service.

Industrial Applicability

As described in the above, the present invention presents a highly reliable temperature sensor ideal for use in a high temperature condition, the shift of resistance value being very small even in a temperature zone 1000° C. or higher.

What is claimed is:

1. A method of manufacturing a temperature senor comprising the steps of:
   obtaining a thermistor by inserting a metal whose melting point is higher than sintering temperature into a composition comprised of a thermistor material and sintering the whole;
   connecting the thermistor with a tube having at least one lead wire via said lead wire;
   disposing a heat resisting cap made of an alloy containing Ni—Cr as the main ingredient to cover said thermistor; and
   coupling the heat resisting cap with said tube.
2. A method of manufacturing a temperature senor of claim 1, wherein a heat resisting cap provided with a heat treatment in advance is used for said heat resisting cap.

3. A method of manufacturing a temperature senor of claim 2, wherein the temperature of said heat treatment is 1000–1200° C.

4. A method of manufacturing a temperature senor of claim 1, further comprising the step of providing a heat treatment in an oxidizing atmosphere.

5. A method of manufacturing a temperature senor of claim 4, wherein the temperature of said heat treatment is 1000–1200° C.

6. A method of manufacturing a temperature senor of claim 1, wherein a heat treatment is provided after said heat resisting cap and said tube are coupled together.

7. A method of manufacturing a temperature sensor comprising the steps of:

obtaining a thermistor by inserting a metal whose melting point is higher than sintering temperature into a composition comprised of a thermistor material and sintering the whole;

connecting the thermistor with a tube having at least one lead wire via said lead wire; and disposing a heat resisting cap made of an alloy containing Ni—Cr—Fe as the main ingredient to cover said thermistor.

8. A method of manufacturing a temperature senor of claim 7, wherein a heat resisting cap provided with a heat treatment in advance is used for said heat resisting cap.

9. A method of manufacturing a temperature senor of claim 8, wherein the temperature of said heat treatment is 1000–1200° C.

10. A method of manufacturing a temperature senor of claim 7, further comprising the step of providing a heat treatment in an oxidizing atmosphere.

11. A method of manufacturing a temperature senor of claim 10, wherein the temperature of said heat treatment is 1000–1200° C.

12. A method of manufacturing a temperature senor of claim 7, wherein a heat treatment is provided after said heat resisting cap and said tube are coupled together.

* * * * *